United States Patent [19]

Fingerle

[11] 4,365,852
[45] Dec. 28, 1982

[54] SNAP CAGE OF PLASTIC MATERIAL FOR BALL BEARINGS

[75] Inventor: Rudolf Fingerle, Esslingen, Fed. Rep. of Germany

[73] Assignee: SKF Kuggellagerfabriken GmbH, Schweinfurt, Fed. Rep. of Germany

[21] Appl. No.: 218,111

[22] Filed: Dec. 19, 1980

[30] Foreign Application Priority Data

Dec. 24, 1979 [DE] Fed. Rep. of Germany ....... 2552252

[51] Int. Cl.³ ............................................. F16C 33/38
[52] U.S. Cl. ..................................................... 308/201
[58] Field of Search ................... 308/188, 189 R, 193, 308/195, 199, 201, 217

[56] References Cited

U.S. PATENT DOCUMENTS 3,403,951 10/1968 Bailey ................................... 308/201
4,225,199 9/1980 Earsley ................................. 308/201

FOREIGN PATENT DOCUMENTS 2014420 6/1978 Fed. Rep. of Germany ...... 308/201
19936 of 1908 United Kingdom ............... 308/201

*Primary Examiner*—John Petrakes
*Assistant Examiner*—Daniel P. Stodola

[57] ABSTRACT

A plastic snap cage for ball bearings formed of an annular ring having a plurality of pockets each for receiving a ball therein uniformly spaced about the periphery thereof. Each of the pockets have an opening formed at one front edge of the ring limited by planar surfaces extending parallel and symmetrically to a radial line across the entire width of the wall cage thus defining the inside width of the pocket opening. Each of the pockets are also provided in the radial direction with a cylindrical first section conforming to the diameter of the ball and open towards the outer circumference of the cage, an adjacent conically tapering section forming bearing surface for the ball and adjacent to the latter a cylindrical, axially short third section. The entire pocket opening extends in depth in a radial plane open only to the first cylindrical section, up to its inside width.

2 Claims, 3 Drawing Figures

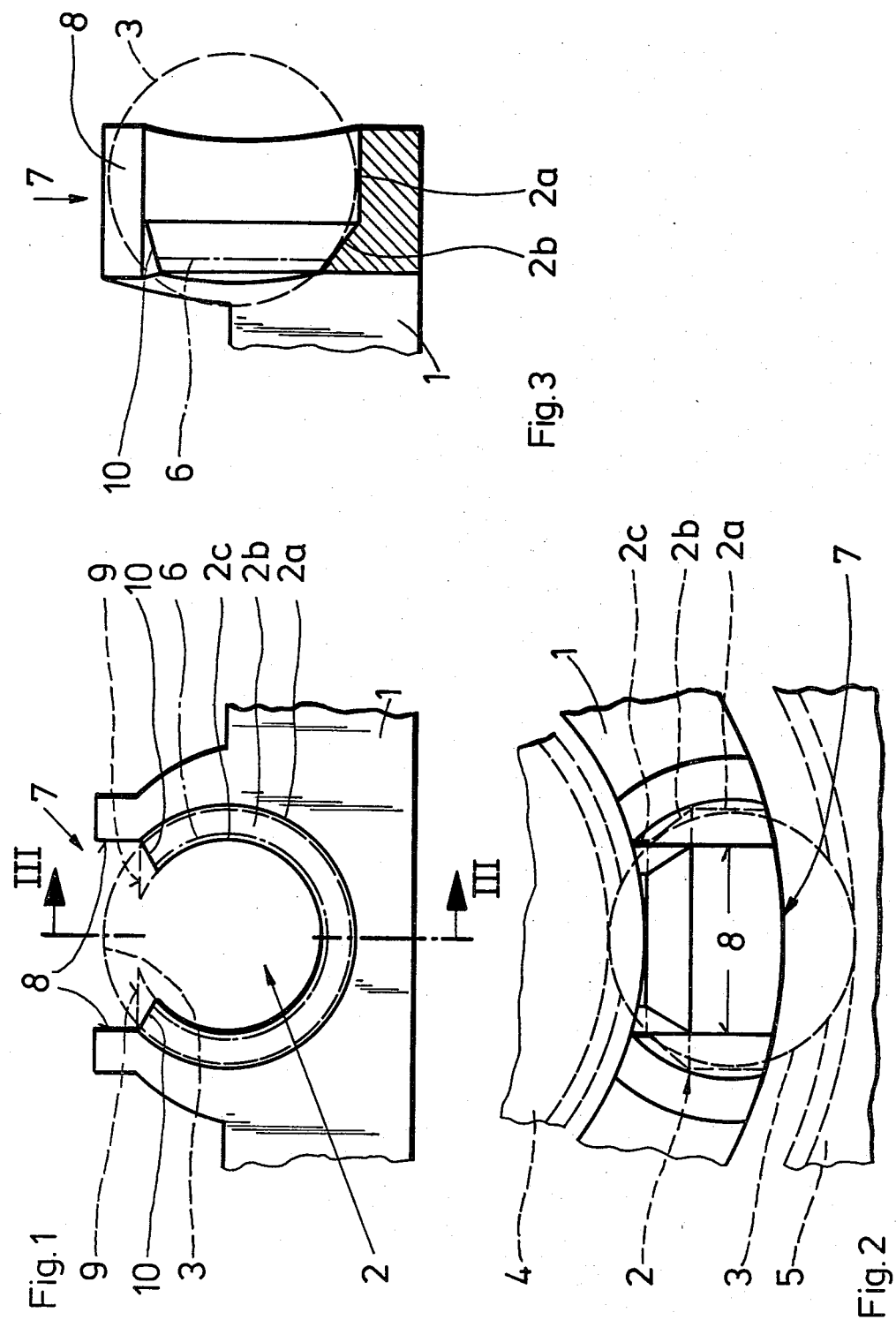

SNAP CAGE OF PLASTIC MATERIAL FOR BALL BEARINGS

BACKGROUND OF THE INVENTION

The present invention relates to plastic cages for ball bearings.

A plastic cage for ball bearings is known (DD-PS 32 287) in which pockets are formed on one frontal edge, each pocket having an opening, limited by surfaces extending planeparallel and symmetrically to a radial line across the entire width of the wall of the cage, thereby determining the inside width of the pocket opening. The pockets are provided with spherically formed ball seat which, at high speeds, come into contact with the balls alternatingly at different places of their surface, while the bearing is in rotation. The contact area is furthermore reduced in its size because the pocket openings which, in its depth leads into the pocket, is formed in its entire radial extension so as to be open into the inside width of the pocket. Both will cause unsteady rotation of the cage with an especially unfavorable effect on bearing rotation and thus on the bearings themselves when rotating at high speeds.

It is an object of the invention to produce a cage which will not have these faults, and to design a cage in a shape which will result in contact with the ball always on the same pocket surface while the bearings are in rotation. It is a further object to provide at the same time a contact area between both parts as large as possible so as to ensure steady running of the cage, at very high speeds.

SUMMARY OF THE INVENTION

These tasks have been solved by providing a plastic snap cage for ball bearings comprising an annular ring having a plurality of pockets for receiving a ball therein uniformly spaced about the periphery thereof. Each of the pockets have an opening formed at one front edge of the ring limited by planar surfaces extending parallel and symmetrically to a radial line across the entire width of the wall cage, thus defining the inside width of the pocket opening. Each of the pockets are also provided in the radial direction with a cylindrical first section conforming to the diameter of the ball and open towards the outer circumference of the cage, an adjacent conically tapering section forming bearing surface for the ball and adjacent to the latter a cylindrical, axially short third section. The entire pocket opening extends in depth in a radial plane open only to the first cylindrical section, up to its inside width.

As a result of the special shape of the pocket selected, a line contact results between pocket surfaces of the cage and the respective ball in the area of the conically tapering second section of the pocket, ergo at the identical site in each pocket and throughout the rotation only the minimum required for the pocket opening is cut out for this contact path, the latter opening in its depth only the first cylindrical section of the pocket up to the inside width. This results in the longest contact path possible so that satisfactory guidance of the cage on the balls and a steady running of the cage is obtained with bearing rotation at high speed.

Although a ball bearing cage is already known to the art (DE-OS No. 23 43 749), having pockets which run in a radial direction of the cage and have a cylindrical and an adjacent conical area, the objects of the present invention are not obtained. In the known art, the conical areas are located alternatingly in one pocket on the inside rim of the cage and in the adjacent pocket on the outside rim of the cage. In this cage, which is not designed as a snap cage, the conical area is located on lips under initial stress which press the balls against the respective outer or inner bearing race, thus, preventing the knocking of the two races against each other within the limits of the bearing play, when the bearing is subjected to shocks and intermittent running, stands still. This bearing is not suitable for permanent high-speed operation.

In further development of the invention, the surface wall sections of the pocket opening are bevelled into the conically tapering second section so that extremely sharp edges in the area of the conically tapering pocket section are prevented from arising.

BRIEF DESCRIPTION OF THE DRAWINGS

In the drawings:

FIG. 1 is the side elevation view of a section of the cage of the present invention;

FIG. 2 is a top plan view of the cage section according to FIG. 1;

FIG. 3 is a sectional view taken along the line III—III of FIG. 1.

DESCRIPTION OF THE INVENTION

In the figures, only a portion of the plastic snap cage is shown for clarity. The cage is formed of an annular ring 1 having several identical ball pockets 2 which, as may be seen from FIG. 2, receives a ball 3 rotating between an inner race 4 and an outer race 5. The pocket 2 is shaped in the radial direction to have a cylindrical first section 2a open towards the outer circumference of the cage, (ie: outer race 5), an adjacent conically tapering second section 2b, and adjacent to the latter a cylindrical, axially short third section 2c (face the inner race 4). The first section 2a of the pocket 2 conforms to the diameter of the ball 3 so that it receives the ball inside itself with easy play. The second section 2b, however, runs tangentially to the surface of the ball 3 so that it rides abuttingly on the ball 3. With high-speed rotation of the bearing and a proportionately high number of revolutions of the cage 1, the second section 2b increasingly comes to rest against the balls by centrifugal force.

The line 6, drawn in dot-dash outline in the FIGS. 1 and 3, indicates the contact path of the ball 3 on the conically tapering second pocket section 2b. Adjacent to this section 2b is the axially short, cylindrical third section 2c of the pocket 2, beyond which the ball 3 extends without being touched.

The linear contact between cage and ball, resulting from the cylindrical-conical-cylindrical form of the pocket, insures that the contact is always in the same conical area of the pocket, and embraces relatively large surfaces. Thus, an especially satisfactory mounting of the cage 1 on the balls 3 is obtained which leads to steady rotation of the cage.

For the purpose of sliding and snapping the cage 1 onto the balls 3 held between the races 4 and 5, the cage 1 is provided on one frontal edge with an opening 7 for each pocket 2, the inside width of which is determined by the mutual distance of two planar surfaces 8, extending parallel and symmetrically to a radial line over the entire width of the wall of the cage.

The dimension of the inside width between the surfaces 8 is determined by the diameter of the ball and the ductility of the material from which the cage is made so as to avoid damage during the snap-on process. In addition, special forms of construction of the cage promotes this ductility, consisting of the fact, that, as may be seen from the FIGS. 1 and 2, the area of pocket 2 adjacent the pocket opening 7 is formed, inside of cage walls, and projects freely from the otherwise closed race part of the cage 1.

Although the pocket opening 7 as seen in FIG. 2 extends downwardly from the frontal edge to cut out a certain area from the conically tapering section 2b of the pocket 2, thereby reducing the length of the contact path between cage and ball indicated by the line 6, this reduction is kept as short as possible because the depth of the pocket opening 7 leading into the pocket 2 and extending in a radial plane of cage 2, should cut open only to the first cylindrical section 2a (ie: up to the inside width). This is especially noticeable from FIG. 1, wherein the hyphenated line 9 indicates the course of the radial plane which extends vertically in relation to the sheet of drawings, and which results in the area of the conically tapering pocket section 2b if the pocket opening 7 has been given the depth mentioned.

It can be recognized that then only the smallest sector required has been cut out of the contact path between ball and cage running along the circular line 6. As shown by the heavy lines 10, the pocket opening 7 is in addition bevelled down the depth of the pocket 2 towards the section 2c, for the purpose of breaking possibly created extremely sharp edges in the area of the conically tapering pocket section 2b. The length of the contact path between ball and cage marked by the line 6 is only slightly reduced, but retains nevertheless a substantially greater length than it would have if the pocket opening 7 were to lead overall deeper into the pocket 2 than described above.

I claim:

1. A plastic snap cage for ball bearings, comprising an annular ring having a plurality of pockets for receiving a ball therein, uniformly spaced about the periphery thereof, each of said pockets having an opening formed at one front edge of said ring limited by planar surfaces extending parallel and symmetrically to a radial line across the entire width of the cage and defining the inside width of the pocket opening, each of said pockets being provided in the radial direction with a cylindrical first section conforming to the diameter of the ball and open towards the outer circumference of the cage, an adjacent conically tapering section forming a bearing surface for the ball, and adjacent to the latter a cylindrical, axially short third section, said pocket opening having surface wall sections extending in depth in a radial plane to the first cylindrical section up to the inside width of said first cylindrical section.

2. A snap cage according to claim 1, wherein the surface wall sections of the pocket opening are bevelled down into the conically tapering second section.

* * * * *